(No Model.)
H. W. SISSON.
DEVICE FOR PREVENTING HORSES FROM KICKING.
No. 411,513.                Patented Sept. 24, 1889.
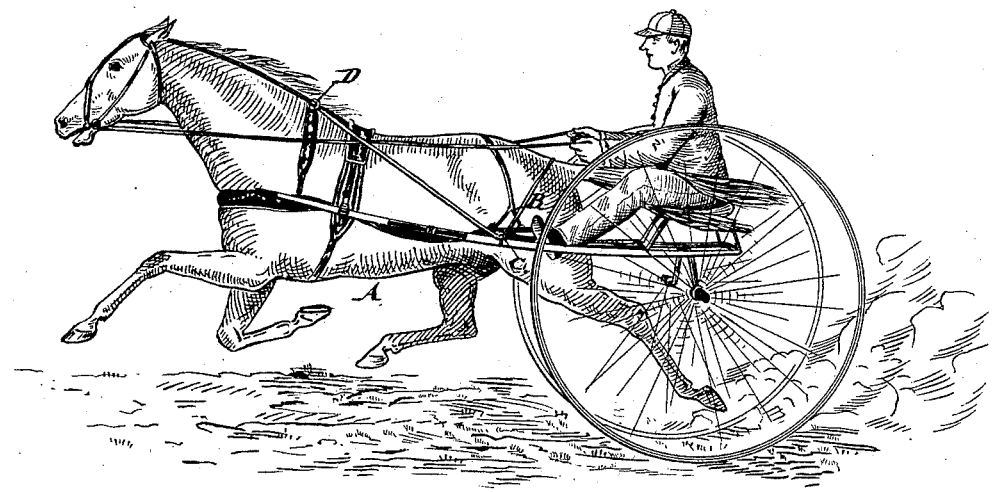
Witnesses                                  Inventor
H. D. Nealy,                            Harry W. Sisson,
J. W. Fowler,                      by his Attorneys,
                                        A. H. Evans & Co.

UNITED STATES PATENT OFFICE.

HARRY W. SISSON, OF MONMOUTH, ILLINOIS.

DEVICE FOR PREVENTING HORSES FROM KICKING.

SPECIFICATION forming part of Letters Patent No. 411,513, dated September 24, 1889.

Application filed April 29, 1889. Serial No. 309,047. (No model.)

*To all whom it may concern:*

Be it known that I, HARRY W. SISSON, a citizen of the United States, residing at Monmouth, in the county of Warren and State of Illinois, have invented certain new and useful Improvements in Devices to Prevent Horses from Kicking, of which the following is a full and clear description, reference being had to the accompanying drawing, forming a part of this specification, in which—

The figure represents a horse in harness with my device applied.

My present invention relates to devices for breaking and preventing horses in harness from kicking; and it consists in the combination and arrangement of the several elements hereinafter explained and claimed.

To enable others skilled in the art to which my invention appertains to make and use the same, I will now proceed to describe its construction.

In the drawing, A represents a horse being driven in single harness with my device applied to prevent his kicking.

B is a strap passing over the hips or rump of the horse and passing through the rings C, secured to the shaft on each side, thence extending forward to and through a ring D, and thence over his head to a point on his face, where it again separates and passes through his mouth, as shown in the drawing. That portion of the strap which passes through the mouth of the horse may be round, square, or of other shape, or may be padded in any well-known manner to protect the horse's mouth and to avoid the strap being cut by the horse's teeth. Instead of the strap B passing through the mouth of the animal, the strap may be divided at the mouth and attached to the bridle-bit on each side, as the effect of the strap would be the same. It is evident that with this arrangement of the strap B, if the horse attempts to kick, in which attempt he must throw up his rump or hips, he will draw on the strap and force his head up by the same movement, thus necessarily stopping the attempt to kick. It has been ascertained by actual experience that a horse thus provided with the strap B, finding himself unable to kick without at the same time jerking his head up, will soon cease all attempts to kick and become perfectly gentle and safe in harness.

Having thus described my invention, what I claim as new, and desire to secure by Letters Patent, is—

The combination, with the rings C on the shafts and the rings D on the saddle of the usual harness, of the strap B, adapted to be passed through the mouth of the horse and over his head, and thence through said rings and over his rump, whereby the horse is prevented from kicking, substantially as described.

HARRY W. SISSON.

Witnesses:
W. H. PATTERSON,
J. EDWARD FOWLER.